Jan. 22, 1963 N. I. BOHLIN 3,074,669
DEVICE TO PROTECT AN OCCUPANT AGAINST BODILY INJURY
DURING EMERGENCY ESCAPE FROM AIRCRAFT
Filed Aug. 28, 1959 7 Sheets-Sheet 3
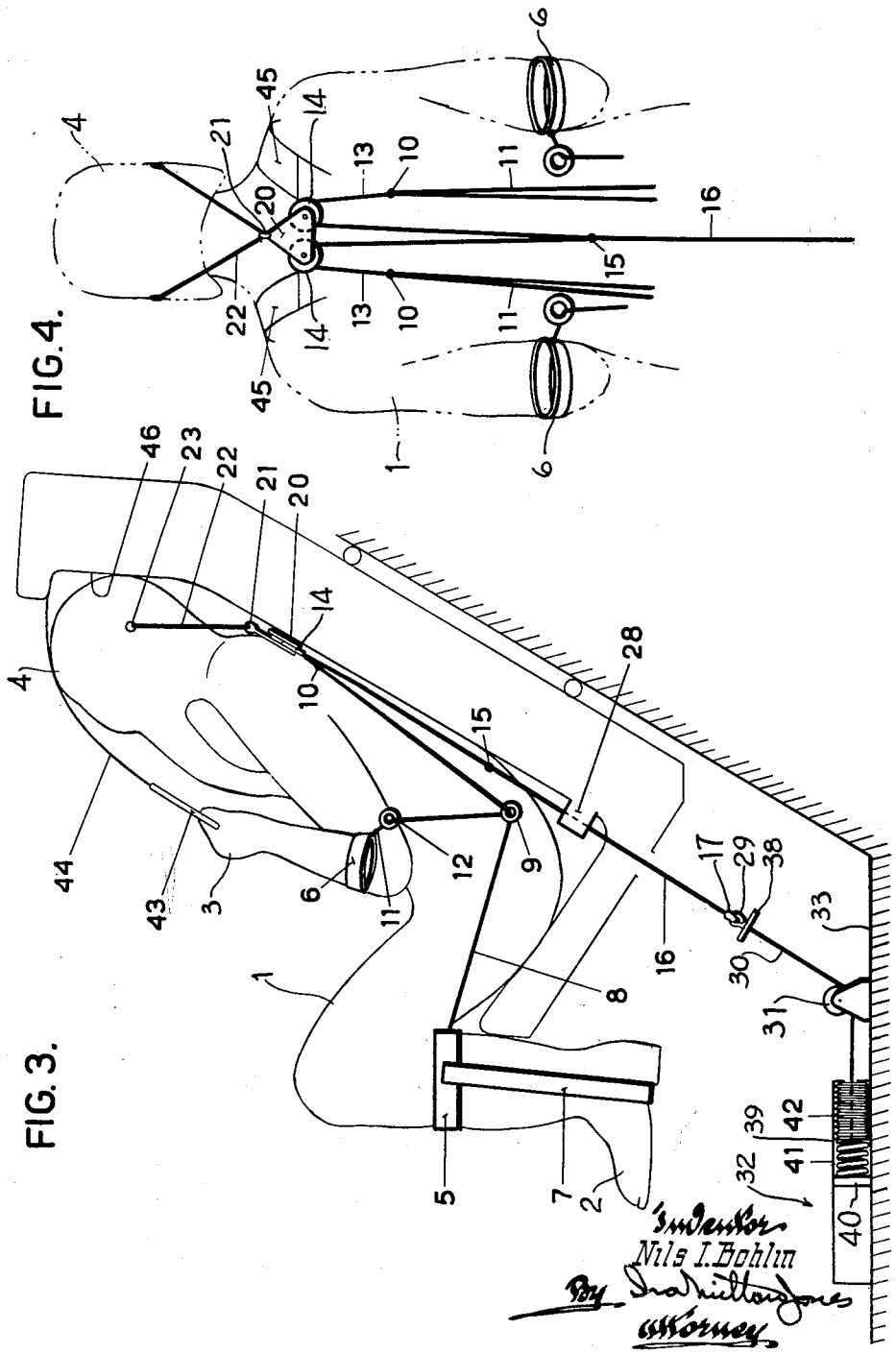

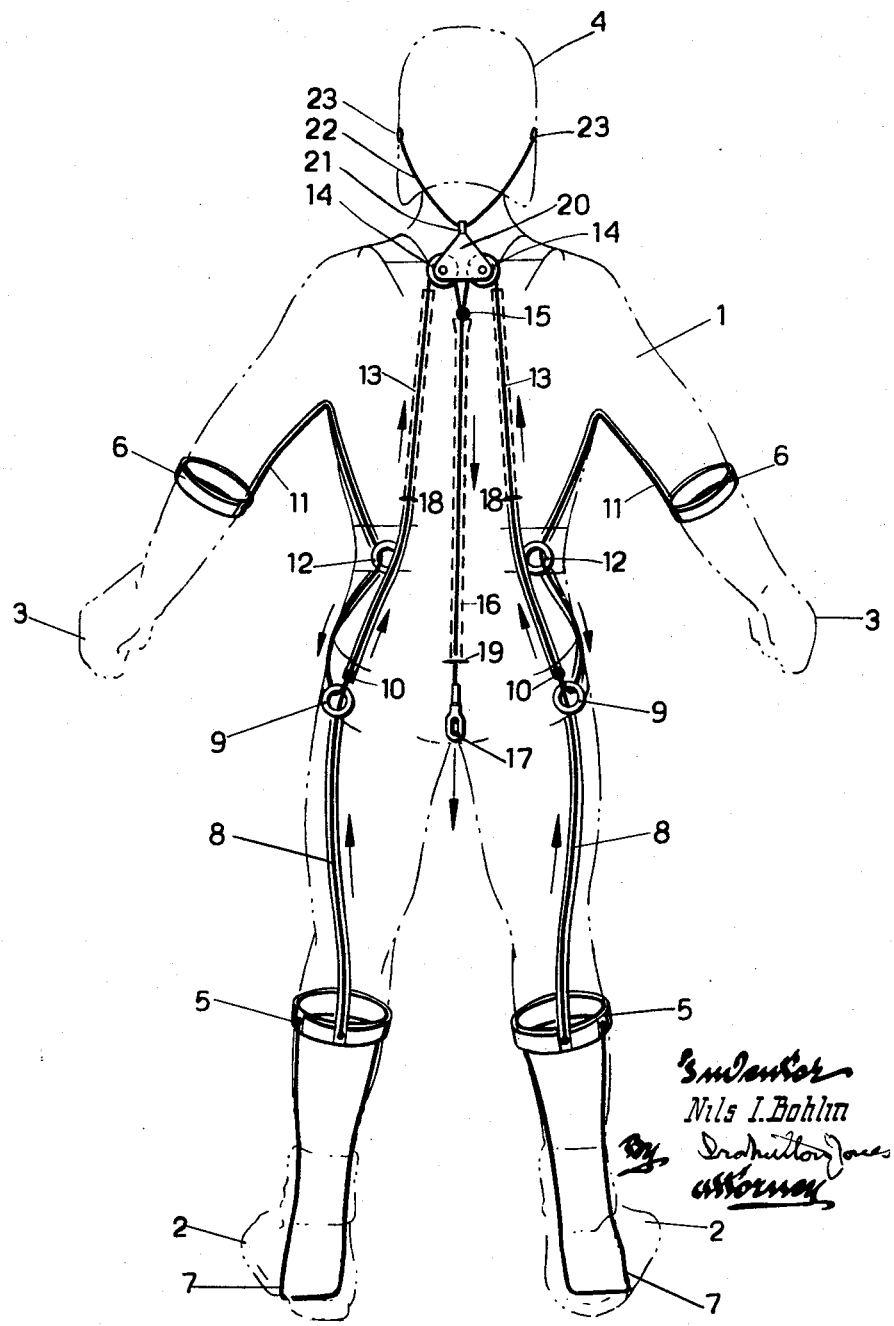

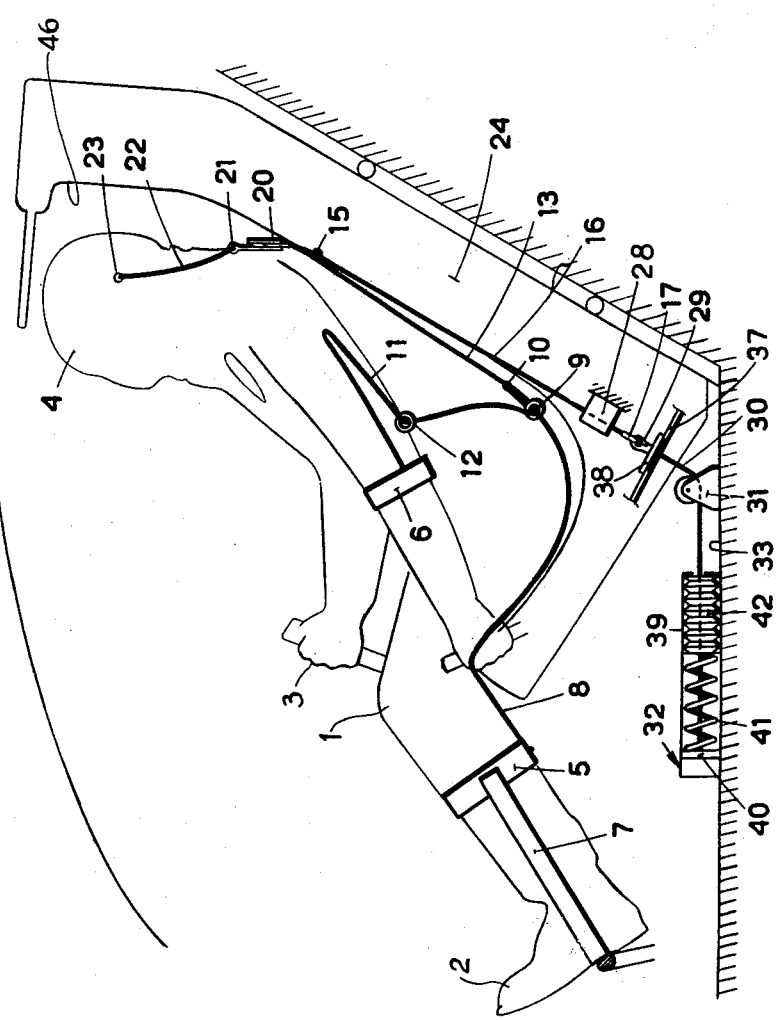

Jan. 22, 1963  N. I. BOHLIN  3,074,669
DEVICE TO PROTECT AN OCCUPANT AGAINST BODILY INJURY
DURING EMERGENCY ESCAPE FROM AIRCRAFT
Filed Aug. 28, 1959  7 Sheets-Sheet 4
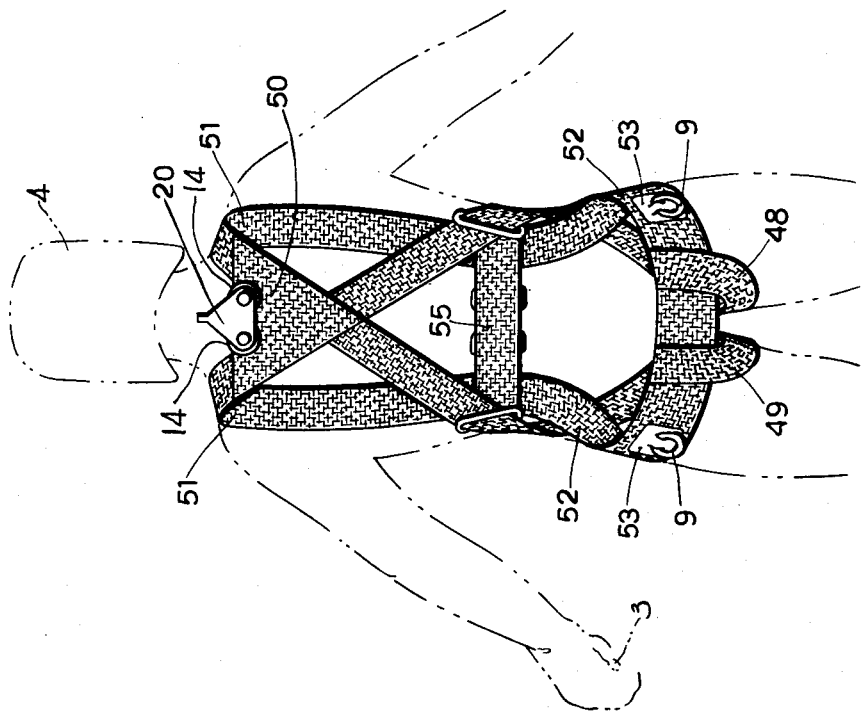
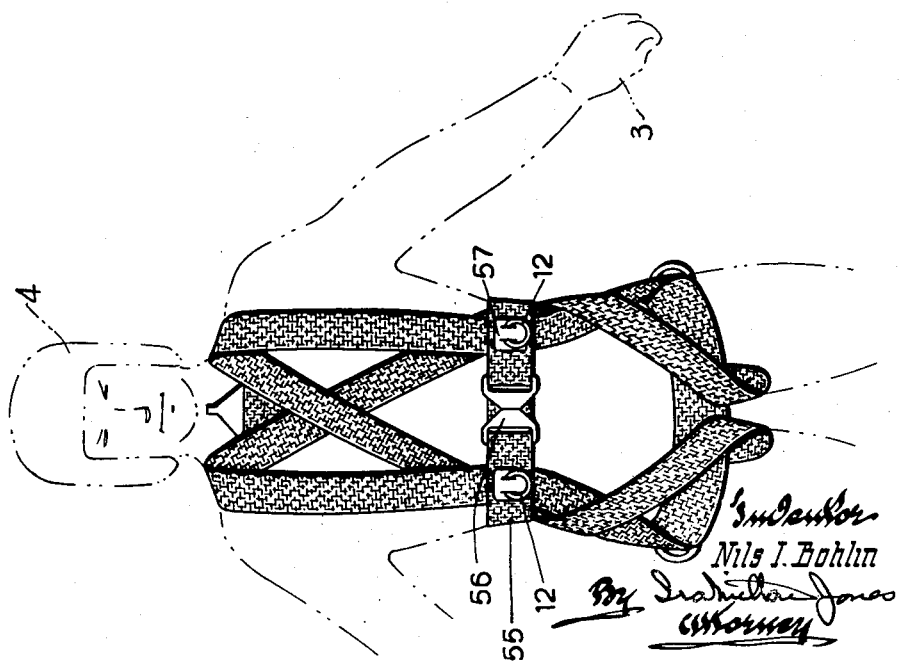

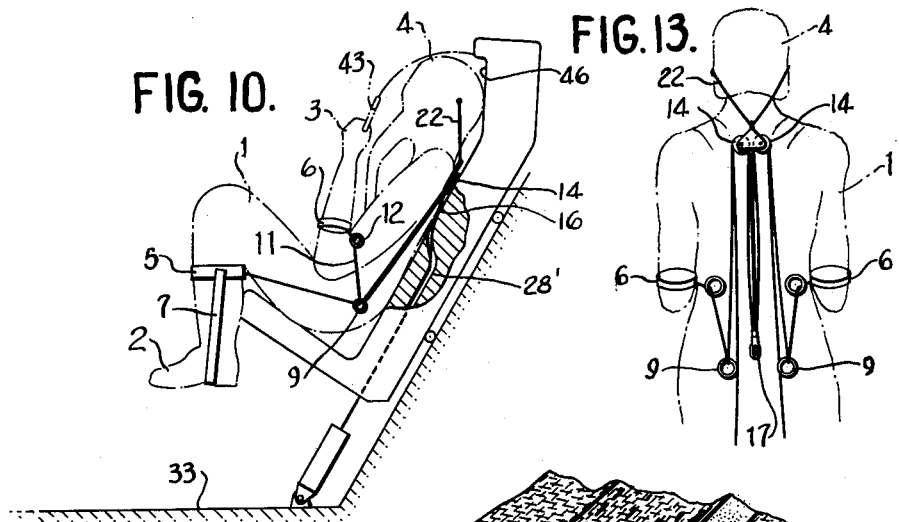
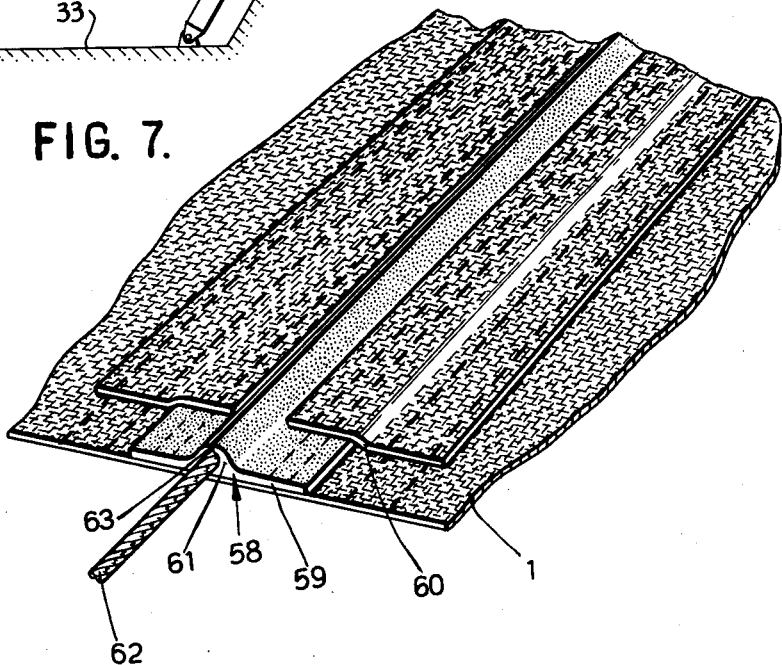

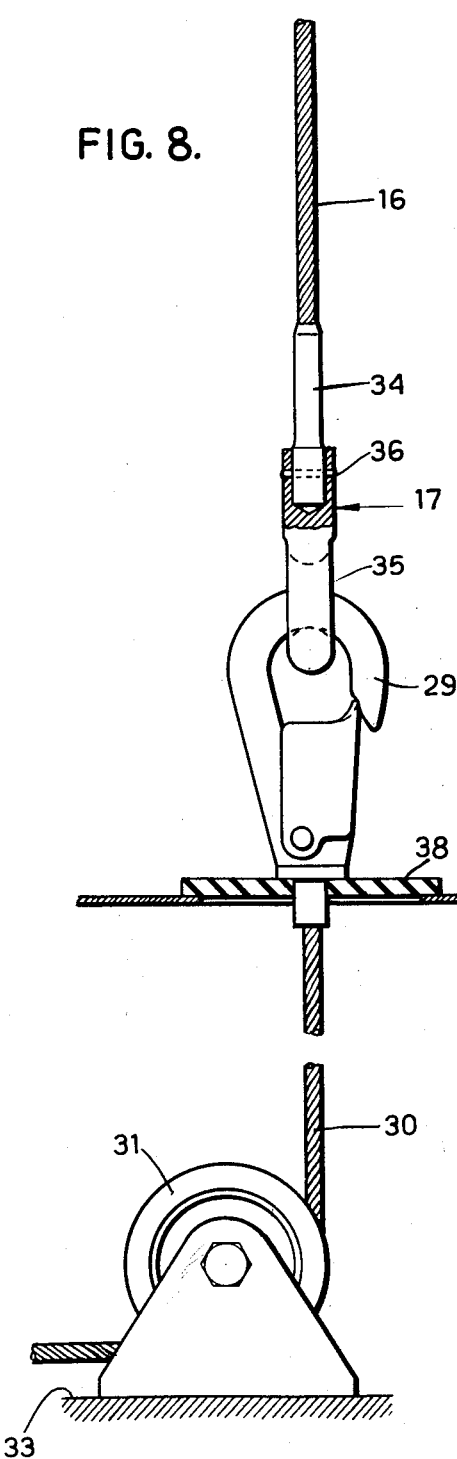
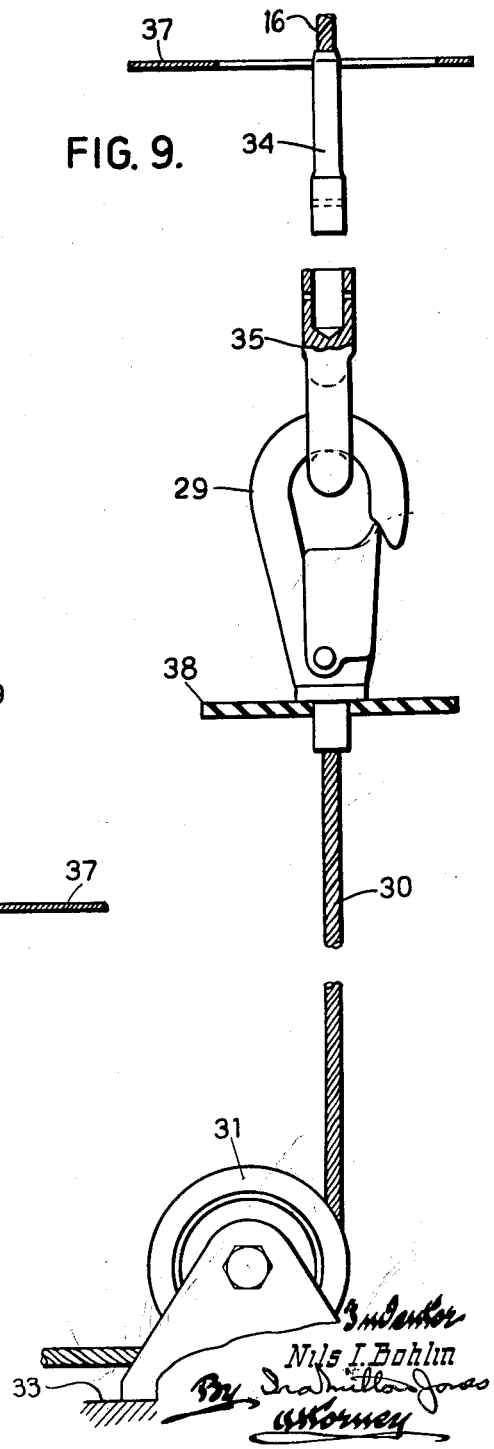

Jan. 22, 1963  N. I. BOHLIN  3,074,669
DEVICE TO PROTECT AN OCCUPANT AGAINST BODILY INJURY
DURING EMERGENCY ESCAPE FROM AIRCRAFT
Filed Aug. 28, 1959  7 Sheets-Sheet 7
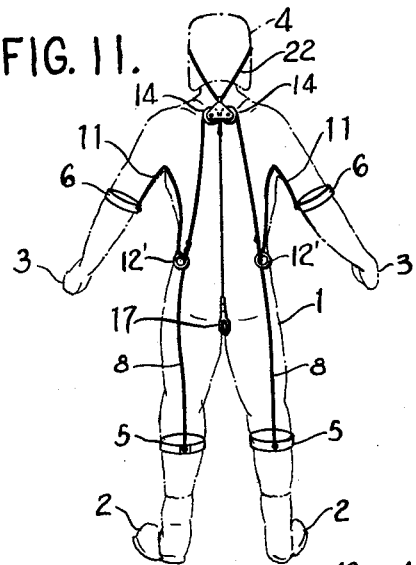
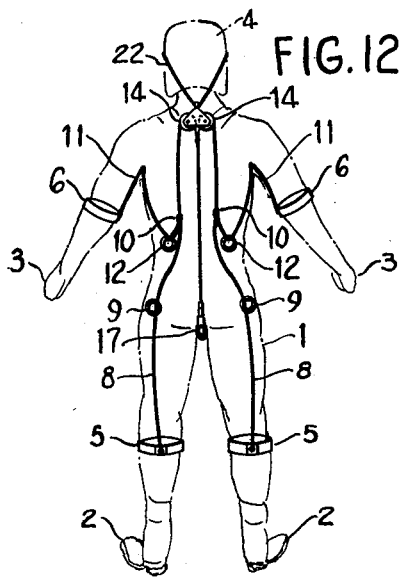
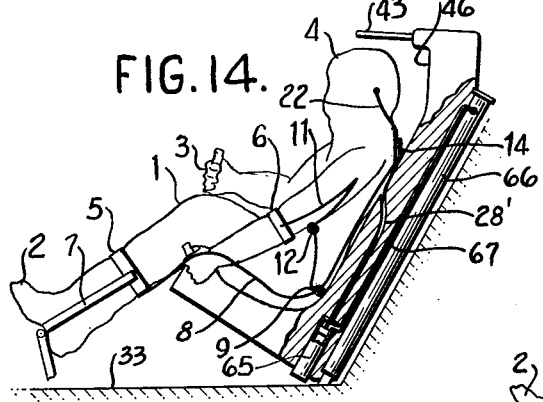
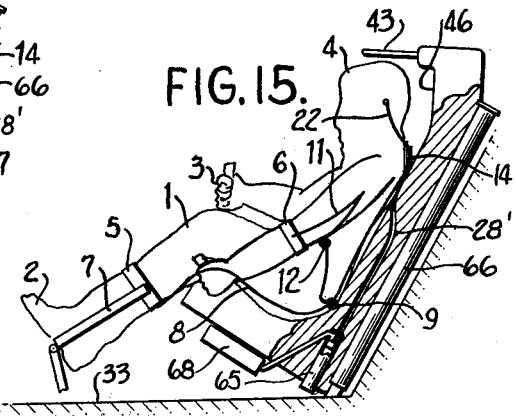
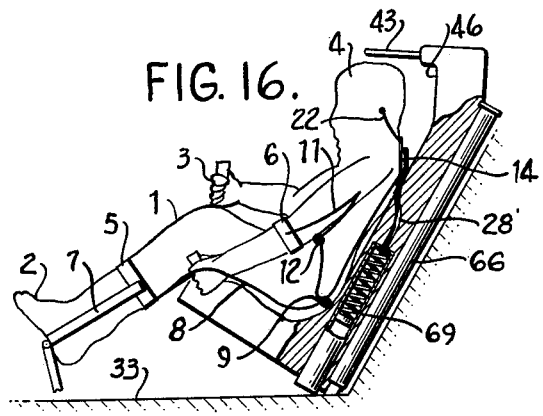
Inventor
Nils I. Bohlin

United States Patent Office 3,074,669
Patented Jan. 22, 1963

3,074,669
DEVICE TO PROTECT AN OCCUPANT AGAINST BODILY INJURY DURING EMERGENCY ESCAPE FROM AIRCRAFT
Nils I. Bohlin, Goteborg, Sweden, assignor to Svenska Aeroplan Aktiebolaget, Linkoping, Sweden, a corporation of Sweden
Filed Aug. 28, 1959, Ser. No. 837,567
11 Claims. (Cl. 244—122)

The present invention relates to a device for protecting an occupant against bodily injury upon emergency escape from an aircraft, which device draws the occupant's body members into, and holds them in, positions most favorable for such escape.

On account of the ever increasing speeds of flight, the emergency escape of occupants of aircraft in distress has become a serious problem. Experience has shown that the human body has difficulties in resisting the physical strains to which it is exposed, particularly in the case of escape from military high performance aircraft which the crew may be forced to abandon at speeds at or above supersonic speed.

The physical strains on the body of the occupant emanate primarily from the external forces which act on the body when the occupant abandons the aircraft by means of an emergency escape device and is rapidly carried out into the slip stream. The forces are mainly of two kinds, namely the wind blast forces due to the pressures created by the high speed airstream into which the occupant is thrown, and forces caused by inertia due to rapid acceleration during ejection and deceleration after leaving the aircraft. Each of these can give rise to fractures and injuries by tearing, particularly of arms and legs, but the occupant's head and trunk can also be seriously injured. To a certain degree the physical strains depend on the kind of escape device used, since the occupant of an open escape device, such as an ejection seat, is unprotected against the airstream and is exposed to both the wind blast forces and forces of inertia, while the occupant of a closed escape device is exposed only to the forces of inertia. In the latter case, however, there is a very great risk of bodily injuries since the forces of inertia are not counteracted by the oppositely directed wind blast forces as is the case with open escape devices. Investigations of the cause of injuries during escape from high speed aircraft have further shown that the emergency escape vehicle, irrespective of the type of escape device used, in many cases becomes unstable after leaving the aircraft, and as a result tumbles at a rapidly increasing rate. Such tumbling movements create forces which, together with the already mentioned wind blast forces and/or forces of inertia, can give rise to completely uncalculable power phenomena. Irrespective of the type of escape device used it is evident that injuries may arise on account of the above mentioned physical strains to which the body or parts of the body of the occupant are exposed and against which he is unable to protect himself.

Several devices have heretofore been known for fixing an airman's body members in predetermined positions in relation to an ejection seat by means of tension lines or the like which are rendered operative to effect such positioning upon ejection of the seat. As a rule, however, these prior devices were intended to position only certain parts of the body, such as the legs, leaving other body members wholly unprotected. In prior devices which provided for the positioning of more than one part of the body, different body members were fixed in position by different and unconnected holding means on the ejection seat, so that synchronization of release of the several holding means both with respect to one another and with respect to the airman's separation from the ejection seat, could not be satisfactorily assured. Obviously if some of the airman's body members remained confined and attached to the ejection seat after others had been released, the entire purpose of the mechanism for positioning the airman's body members could be defeated.

By contrast, it is an object of the present invention to provide means for protecting an occupant against bodily injury during emergency escape from a high speed aircraft, by fixing all of his body members in positions in which he will be afforded maximum protection, and wherein the above mentioned deficiencies of prior devices of this type are overcome.

More particularly it is an object of the present invention to provide a device of the character described for moving parts of the body to predetermined positions upon the initiation of emergency escape from an aircraft by means of an ejection seat or the like, and for locking the body members in such positions so as to obtain a physiologically proper fixing of the parts of the body with respect to the external forces, and for simultaneously releasing all such parts before the airman's separation from the escape device.

More specifically, it is a further object of this invention to provide a device of the above described character having means adapted to be connected to the several members of an airman's body, and which are all connected to a single part that is adapted to be actuated in consequence of emergency ejection of the airman from an aircraft, and wherein said part effects substantially simultaneous movement of the airman's body members into predetermined positions when ejection escape is initiated, maintains them locked in such positions during ejection, and after ejection provides for simultaneous release of all of the body members immediately prior to separation of the airman from the escape device.

A further object is to provide a device of the above described character wherein the positioning and locking of the parts of the body automatically take place during the primary phase of the emergency escape before the airman is exposed to the outside forces.

Another object of the invention is to provide, in a device of the above described character, yieldable means for gently moving the parts of the body to the locking position during the primary phase of the escape.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

FIGURE 1 is a diagrammatic rear view of the device of this invention, showing the same as it would appear on an airman standing in an upright position;

FIGURE 2 is a diagrammatic side view of the device, showing the same as it would appear on an airman normally seated in an aircraft ejection seat.

FIGURE 3 is a view similar to FIGURE 2 but showing the device on an airman in the position occupied during ejection escape from an aircraft;

FIGURE 4 is a fragmentary rear view of the device showing the same during ejection escape.

FIGURE 5 is a front view of the harness portion of the device as it appears on an airman standing upright;

FIGURE 6 is a rear view of the harness, as it appears when worn by an airman in a standing position;

FIGURE 7 is a fragmentary perspective view, partly in section, of one of the line leads of the flying suit of this invention;

FIGURE 8 is a fragmentary view on an enlarged scale, partly in side elevation and partly in section, of the connection between the terminal member of the device of this invention and a part fixed on an aircraft, the parts being shown in their normal positions;

FIGURE 9 is a view similar to FIGURE 8 but showing the parts during ejection operation.

FIGURE 10 is a view similar to FIGURE 3 but illustrating a slightly modified manner of connecting the tension lines to the aircraft;

FIGURES 11 and 12 are views similar to FIGURE 1, but illustrating two somewhat different locations for certain of the guide means through which the tension lines pass;

FIGURE 13 is a view similar to FIGURE 4 showing another arrangement of tension lines; and FIGURES 14, 15 and 16 are views similar to FIGURE 3, showing different possible expedients for tightening the tension lines during ejection of the escape device.

As best shown in FIG. 1 the airman's body is wholly covered by clothing consisting of a coverall 1 surrounding the torso and limbs, shoes 2, gloves 3 and a helmet 4. The coverall is provided with four clamp fasteners, two of which, designated by 5, are adapted to be fastened around the airman's calves while the other two fasteners 6 are applied around the arms. The specific location of the fasteners 6 along the length of the arms should be determined with relation to the movements the airman has to carry out to actuate the escape equipment. To fix the selected locations of the fasteners 6 they are secured either to the gloves 3 or the sleeves of the coverall. In order to prevent upward displacement of the fasteners 5 each of these is connected with a strap 7 embracing the wearer's instep.

From the four fasteners 5 and 6 there extend tension lines which are carried by the suit in predetermined leads or channels, which are described hereinafter. Thus from the fasteners 5 two cables 8 extend along the rear side of the legs, at the exterior of the coverall, along the hollows behind the knees and thence along the thighs to two ring-shaped guides 9 located at the hips, which guides are attached to power absorbing means that are described hereinafter. Each cable 8 terminates at a point 10 just above the ring. To the cables 8 there are connected tension lines 11 in the form of two other cables, each connected to one of the fasteners 6, and which are also placed on the exterior of the suit so as to extend along the upper arm to the armpit and from there at an oblique angle in a downward-forward direction along the chest where the cables 11 are slideably trained through two other ring-shaped guides 12, thence along the waist and through the guides 9 to the points of connection 10 with the cables 8. From these points two cables 13 extend upwardly along the back and are trained around pulleys 14 at the level of the shoulders. Just below the pulleys 14 the cables 13 are connected with one another at a point 15, where they also connect to the upper end of a terminal cable 16 that extends downwardly along the spine and has at its lower end a connection fitting 17 behind the airman's seat. As designated by broken lines in FIGURE 1, except in the neighborhood of pulleys 14 the cables 13 and 16 run in channels consisting of tubes of plastic or the like sewed on the coverall, from points 18 spaced above the guide members 9 to a point 19 centered on the rear of the suit near the level of said guide members. The channels are flexible and so formed that their cross section area is not materially changed when they are bent, and they are also such that the cables are easily slidable in them.

The two pulleys 14 are positioned by means of a support 20 which has an eye 21 in a part that extends upwardly toward the helmet. Through the eye 21 there passes a cable 22 the ends of which are anchored on sockets 23 on the helmet 4. As indicated in FIG. 1 the support 20 is attached to power absorbing means extending over the shoulder and which is described hereinafter.

Normally the airman's faculty of motion is unaffected by the device when the tension lines occupy their above described free positions. Arms and legs can be freely moved since the cables 8, 11, 13 and 16 are located on the coverall and easily move with it at each movement of the body. The head can also be moved to a sufficient degree relative to the trunk since the cable 22 from the helmet 4 to the support 20 is slack and can slide in the eye 21.

FIG. 2 illustrates how the airman sits in a normal position in an ejection seat 24 of an aircraft which he can maneuver without hindrance from the device of this invention. Before the flight the airman passes the lower end portion of the terminal cable 16 through a cable guide 28 and connects the connection fitting 17 thereon with a hook 29 which comprises part of a connection secured to the aircraft. This connection comprises a cable 30 to one end of which the hook 29 is attached and which is trained over a cable pulley 31 to have its other end connected to a shock absorber means 32, both the pulley and the shock absorber being attached to the floor 33 of the cabin of the aircraft. As best seen from FIG. 8 the connection fitting 17 comprises a rod part 34 coaxially attached to the terminal cable 16 and a ferrule 35 in which the rod part 34 is inserted and fastened by means of a frangible pin 36 extending therethrough. The pin is of such strength that it can resist a certain maximal braking load but shears when this load is exceeded, releasing the rod part 34 from the ferrule 35 and thus severing the connection between the terminal cable 16 and the aircraft.

To make it easy for the airman to put together the connection fitting 17 and the hook 29 when he is in sitting position the hook is placed within easy reach on a sheet metal shelf 37 on the ejection seat, having a hole therein through which the cable 30 extends, and the hook is held in position by means of a washer 38 of rubber or other easily deformable material which overlies the shelf around the hole.

The shock absorber means 32 consists of an aircraft-fixed tubular housing 39 with a plunger 40 coaxially slideable therein and connected with the end of the cable 30. A weak compression spring 41 engages the plunger and tends to hold the cable 30 stretched. The spring is so dimensioned that it allows for re-adjustment of the ejection seat vertically to accommodate different airmen without the cable being slack or the washer 38 being forced through the hole in the sheet metal wall 37, and also provides for the cable displacement which is necessary to bring the connection fitting 17 and the hook 29 together.

The tubular housing also has mounted therein a damping means 42 which cooperates with the plunger 40 to substantially absorb the shock which would otherwise arise in the tension lines, and thereby also in the airman's body, when ejection takes place.

Let it now be assumed that the aircraft is in distress and that the airman has therefore released a mechanism, not shown, for launching the ejection seat and that the latter is already in motion out of the aircraft. During the first phase of the movement the cable 30 follows the movement of the ejection seat and compresses the spring 41. When the resistance exerted by the spring becomes sufficiently large the washer 38, the hook 29 and the connection fitting 17 will be drawn down through the hole in the shelf 37. During the subsequent movement of the ejection seat the damping means brakes the movement of the cable relatively to the aircraft and therefore the cable will move relatively to the ejection seat and the airman. The terminal cable will thus be displaced downwardly along the airman's back, causing a simultaneous displacement of the tension lines. The parts of the airman's body will thereby be actuated to a position protecting the airman against injuries during the escape, as is diagrammatically shown in FIG. 3.

Due to the tightening of the cables the airman's legs are foldingly drawn up to a position in which they are fixed relatively to his trunk by means of the fasteners 5, the ring-shaped guides 9 and the cable part 8 extending therebetween. Due to the shortening of the cable part 11 extending from the fasteners 6 to the ring-shaped guide 12 his arms are simultaneously placed in a bent up position on his chest. It is of course to be understood that for the tightening of the cables to effect the described placement of arms and legs, the length of the cables must be adjusted to the airman's body size. The displacement of the arms does not prevent the airman from manually retaining a handle 43 on a screen 44 protecting his face, which screen he has pulled down before the ejection, or from carrying out certain movements required during the escape.

Compared with FIG. 1 it will be seen from FIG. 4 that the points 10 and 15 are displaced along paths on the airman's back. Also the support 20 has changed position. On account of the downwardly directed forces in the cables the support 20 and the two shoulder straps 45 are displaced downwardly along the airman's back, tensioning the cable 22 with the result that the head is held in erected position, supported at the rear by a head rest 46 on the ejection seat.

As will easily be seen the airman's body will now occupy a position in which the airman is protected against the effects of external forces, having been moved to this position even though the ejection seat has only moved a certain part of the way it has to move before it is separated from the aircraft and the physical strains on the airman's body commence. After the locking position has been attained, but during the subsequent motion of the ejection seat upwardly, the shear pin 36 will be sheared off to free the rod 34 from the ferrule 35 as illustrated in FIG. 9. The tension lines continue to be retained in locking position by means of the cable guide 28 which also serves as a cable retainer in a manner known per se is so formed that it allows the terminal cable 16 to be freely pulled downwardly from below through an opening in the same but automatically blocks the cable against movement upwardly as soon as the pull ceases. When the connection between the ejection seat and the aircraft is interrupted the guide 28 will thus retain the terminal cable 16 and thereby hold the members of the body in the positions to which they were moved during the ejection.

The locking position is intended to be retained during the travel of the escape vehicle through the air, in any case until the first critical phase of ejection has been passed or at the longest until the airman is to be released from the ejection seat and the parachute is to carry him to the ground. For disengaging the airman from the locking position a time delayed release mechanism, not shown, is used which operates to free the cable from the guide 28.

As already indicated the airman wears around his trunk power absorbing means on which the guides are secured to prevent them from being substantially displaced when the tension lines are tightened. The power absorbing means consists of textile straps which form a harness as appears from FIGS. 5 and 6. The harness comprises a strap which has one of its ends 48 positioned behind the airman's seat and which extends between his legs, thence along the front side of his groins and around the waist to his back where it diagonally crosses the other similarly arranged half of the strap extending from the end 49. In the upper part of the X formed on the back a triangular reinforcement 50 is attached. The strap has two parts 51 which extend from the reinforcement over the shoulders along the front side of the trunk, and a part 52 embracing the hips. Attached to opposite sides of the latter part by stitching are plates 53 which carry the ring-shaped guides 9. The support 20 is attached to the reinforcement 50.

In addition the airman wears a belt or waist strap 55 which is held together by a lock 56 and on opposite sides of this the belt is provided with plates 57 carrying the ring-shaped guides 12. The harness is suitably formed in such a manner that in addition to serving as a power absorbing means for the tension lines it is also adapted to retain the airman to the ejection seat and/or a parachute in a manner known per se. The harness is preferably arranged in channels in the coverall to facilitate putting it on and taking it off as well as facilitating the mounting of the tension lines.

The tension lines are partially placed on the outside of the flying suit. This is especially the case with the cables 8 and 11 but it is also true of the shorter portion of the cable 13 which extends from the guide 9 to the opening 18. In order to prevent these parts from being caught in other objects and causing other troubles to the airman, they are normally located in channels which are provided on the coverall. In FIG. 7 there is shown a section of such a channel 58 which is made from plastic or other soft material and has two laterally outwardly extending flanges 59 that are attached to the cloth of the coverall 1 by means of two strips 60 stitched thereto. The channel itself comprises a pair of upright lips 61 which are so shaped that they form a circular recess for a cable 62 and define, between their adjacent edges, an upwardly opening slot 63. The cable is forced into the channel during mounting of the device on the suit.

When the device is set in operation and the cable has to be shortened relatively to the channel the soft lips will be forced apart so that the cable can move laterally out of the channel to actuate the part of the body to which it is attached. In FIG. 1 the channels are indicated with solid lines on opposite sides of the cables.

The device can obviously be modified in different ways. In FIG. 10 there is shown an alternate embodiment of the connection between the tension lines and the aircraft. The opening on the back of the coverall through which the terminal cable 16 is passed is placed further up along the back, yet not so high that the airman cannot readily connect the end part with a cable which runs in a tubular guide 28' in the back of the ejection seat. The connection is otherwise of the same kind as previously described. The advantage of this embodiment is that the airman automatically occupies a correct body position before the tension lines actuate the parts of his body. During flight he is generally sitting leaning slightly forward without resting his back against the ejection seat. Experience has shown that an airman instinctively crouches forward when the canopy of the cabin is thrown, immediately before the ejection. Such an inappropriate body position at ejection will in this case be corrected because of the relatively high location of the mouth of the tubular guide.

The apparatus can be varied in many ways within the scope of the invention. Depending on the particular structure of the escape device it may e.g. be required to position only the arms or only the legs. As shown in FIGURE 11, the location of the guides for the cables which extend to the limbs can be so chosen that only one guide 12' is required which is substituted for the guides 9 and 12. In other cases, as shown in FIGURE 12, it may be desirable to retain both guides 9 and 12 but to locate the connection points 10 higher up, in which case the cables 11 are not trained through the guides 9.

The connection of the cables to one another can also be changed e.g. as shown in FIGURE 13 separate cables may extend from each limb directly to the terminal connection fitting 17. In this case there will be two cables trained in parallel through the guide members 9 and 14 and four cables extending down the center of the back to the connection fitting 17. This enables each cable to be readily adjusted to a suitable length and the junctions 10 and 15 can be dispensed with.

Since the airman has to seize certain auxiliary release handles during the escape it is important that a certain freedom for motion always remains after the device has attained the locking position. For this reason it may be advantageous to provide the tension lines and the guides with cooperating stop means with a view to limit the movements of the lines, in which case wholly predetermined locking positions of the parts of the body are obtained.

Although it may be preferable to use the relative displacement between the escape device and the aircraft for the tightening of the tension lines, it is of course also possible to use other kinds of power means, e.g. an auxiliary cylinder 65, as shown in FIGURE 14, which receives pressure from the ejection gun 66 with which it is connected by a pipe 67; or from a separate pressure container 68, as shown in FIGURE 15. Also, as shown in FIGURE 16, power from preloaded springs 69 can be used to set the device in operation.

From the foregoing description taken together with the accompanying drawings it will be apparent that this invention provides a device which may be embodied in a flying suit to be worn by an occupant of an aircraft ejection seat or similar emergency escape device, whereby the body members of the seat occupant are actuated to predetermined positions that are favorable for ejection escape when ejection is initiated, and are held in such positions during ejection, and whereby all of the occupant's body members can be released simultaneously at the conclusion of the critical phase of ejection. It will also be apparent that the device of this invention can be quickly and easily put on by the airman and readily connected to cooperating parts on an ejection seat, and that it leaves the airman's body members free for normal movement at all times when locking them in their ejection positions is not required.

What is claimed as my invention is:

1. Apparatus for moving the body members of an occupant of an ejection escape device to predetermined positions favorable for ejection escape from an aircraft, and for holding the occupant's body members in said positions during ejection while providing for simultaneous release of all of his body members from such positions after ejection, said apparatus comprising: a pair of leg fastening elements, each adapted to engage a leg of an occupant, below the knee; a pair of arm fastening elements, each adapted to engage an arm of an occupant; a plurality of guide members, one for each of said fastening elements; harness means adapted to fit on the torso of an occupant and to which the guide members are secured in positions such that one pair of guide members is adapted to be located near an occupant's waist, with one at the left side and one at the right side, and another pair of guide members is adapted to be located at an occupant's rear, between the waist and the knee, with one at the left side and one at the right side; a plurality of tension lines, one for each of said fastening elements, each connected at one end to one of said fastening elements, the tension lines connected to the left and right arm fastening elements being slidably trained through the left and right guide members, respectively, of said one pair of guide members, and the tension lines connected to the left and right leg fastening members being slidably trained through the left and right guide members, respectively, of said other pair of guide members, the tension lines connected to the left arm fastening element and the left leg fastening element being connected with one another, and the tension lines connected to the right arm and leg fastening elements being connected with one another; and means providing a common terminal to which the other ends of all of said tension lines are connected and which is adapted to be connected with a non-ejectable part that effects lengthwise movement of said tension lines in consequence of relative movement between said terminal and an ejection escape device occupied by an occupant wearing the device, and so that release of the common terminal effects relaxation of tension simultaneously in all of said tension lines.

2. In a flying suit having sleeves and legs, and adapted to be worn by the occupant of an aircraft ejection seat or the like, means for moving the limbs of a person wearing the suit to predetermined positions favorable for ejection escape from an aircraft, said means comprising: means in the suit providing a reinforcement in each sleeve thereof, adapted to engage the forearm of a person wearing the suit, below the elbow; means in the suit providing a reinforcement in each leg portion thereof adapted to engage the leg of a person wearing the suit below the knee; means in the suit providing a reinforcing harness which is adapted to embrace the torso of a person wearing the suit; a first pair of guide members secured to said harness near the waist of the suit, one being located near each side thereof; a second pair of guide members secured to said harness at the seat of the suit, one being located near each side thereof; a first pair of tension lines, one for each sleeve reinforcement, each connected at one end to its sleeve reinforcement and being slideably trained through that one of said first pair of guide members which is at the adjacent side of the suit, and thence through that one of the second pair of guide members which is at the same side of the suit; a second pair of tension lines, one for each leg reinforcement, each connected at one end to its leg reinforcement and being slidably trained through that one of said second pair of guide members which is at the adjacent side of the suit; an upper guide member; means securing said upper guide member to the harness at the rear thereof, centered above said first and second pairs of guide members; a third pair of tension lines, one of which is connected to each of the other two tension lines at one side of the suit, and the other of which is connected to each of the other two tension lines at the other side of the suit, the tension lines of said third pair being slidably trained through said upper guide member; and a common terminal connected to both tension lines of the third pair thereof and adapted to be connected to a part which has motion relative to an ejection seat occupied by the wearer of the flying suit upon ejection of said seat, in a direction to tension the lines.

3. The flying suit of claim 2, further characterized by the fact that said means securing the upper guide member to the harness provides for yielding up and down movement of said upper guide member; and further characterized by another line, connected with said upper guide member and adapted to be connected to a helmet worn by a person wearing the flying suit, by which the helmet is drawn rearwardly in consequence of the application of tension to said common tension line and the resultant downward displacement of the upper guide member, so as to dispose the head of a person wearing the helmet in a position favorable for ejection.

4. The flying suit of claim 2, further characterized by the fact that the portion of each of the first pair of tension lines which extends between said one end thereof and the guide member of the first pair thereof is lengthwise slideably and laterally releasably secured to the sleeve and chest portions of the suit so that when the line is not under lengthwise tension it does not interfere with normal use of the arms of a person wearing the suit.

5. The flying suit of claim 2, further characterized by the fact that the portion of each of the second pair of tension lines which extends between said one end thereof and the guide member of the second pair thereof is lengthwise slideably and laterally releasably secured to the leg portions of the suit, at the rear thereof, so that when the lines are not under lengthwise tension they do not interfere with normal use of the legs of a person wearing the suit.

6. In a protective device adapted to be worn by an airman for protecting him against bodily injury upon emergency escape from an aircraft by means of an ejection device: harness means adapted to embrace the torso of an airman; guide means secured to said harness means at the rear thereof, in a location to be disposed substantially over the spine of an airman wearing the harness means; a cable extending through said guide means; a headgear adapted to be worn by an airman wearing the harness; cooperating means on the cable and on the headgear for securing the ends of the cable to the headgear at spaced apart locations at the sides of the headgear; and a tension line connected with said guide means and extending downwardly therefrom to lie substantially along the spine of an airman wearing the harness, said tension line having a terminal at its lower end which is adapted to be connected with a part that has motion relative to an escape device occupied by the wearer of the harness means upon ejection, in a direction to exert tension on the tension line by which the guide means is drawn downwardly to erect the head of an airman wearing the protective device, said cable being long enough to permit free movement of the airman's head when the tension line is untensioned.

7. Apparatus for effecting emergency escape of an airman from an aircraft, of the type comprising an ejection seat in the aircraft having a seat portion and a back rest, said ejection seat being adatped to be occupied by an airman and to carry him bodily out of the aircraft upon ejection, headgear adapted to be worn by the airman to protect his head during ejection, a harness adapted to be worn on the airman's torso, and tension lines for positioning parts of the airman's body in predetermined attitudes favorable for ejection, which tension lines are slidably trained through guide means on the harness and are connected with a part that has motion with respect to the ejection seat upon ejection, to be tensioned thereby: said apparatus being characterized by the fact that one of said guide means is fixed to the harness at the rear thereof, in a position to substantially overlie the spine of an airman wearing the harness, and is connected with one of the tension lines in such a manner as to be drawn downwardly by said tension line upon tensioning thereof; further characterized by a cable trained through said one guide means having its ends connected to the headgear at the sides of the latter, said cable being of a length to be normally slack and permit free movement of the head of an airman wearing the headgear and harness but being adapted to draw the airman's head rearwardly to an erect position upon downward movement of said one guide means due to tensioning of said tension line; and further characterized by a guide member on the back rest of the ejection seat, spaced above the seat portion thereof, through which is trained a portion of said one tension line between said one guide means and said normally fixed means, so that the airman's torso is drawn into firm engagement with the back rest of the ejection seat in consequence of tensioning of said one tension line during seat ejection.

8. The apparatus of claim 7, further characterized by the fact that each of the other tension lines is connected at one end with said one tension line so that all of the tension lines are tensioned in unison; and further characterized by means on the other end of each of said other tension lines for embracing a limb of an airman occupying the ejection seat, to draw the limb to a predetermined position when the tension line is tensioned.

9. In combination with an aircraft carried ejection seat, a protective device for the occupant of the seat by which his limbs are disposed, during seat ejection, in predetermined positions favorable for ejection escape, said device comprising: a harness adapted to be worn on the occupant's torso; a plurality of fastening elements, one adapted to be secured to each of the occupant's limbs to be positioned during ejection; a tension line for each fastening element, each tension line being connected at one end to its fastening element; guide members nonreleasably secured on the harness, through which said tension lines are trained; a common terminal to which the other ends of all of said tension lines are secured; and resiliently yieldable shock absorbing means connected between said common terminal and a non-ejectable part in the aircraft in which the ejection seat is carried, through which said terminal is held to tension the lines upon ejecting motion of the seat relative to the aircraft in which it is carried, but by which the tensioning forces imparted to the terminal are cushioned so that it does not impart abrupt motion to the fastening element.

10. In a protective device for an occupant of an aircraft ejection seat, means for moving the occupant's arms to positions close to his body, with the forearms overlying the chest, and for holding the arms in such positions during ejection, said means comprising: a pair of arm fastening elements, each adapted to engage an arm of an occupant below the elbow; harness means having a torso embracing portion and a waist portion, with parts of the torso embracing portion adapted to be disposed at the back of the weather and at his sides, near the waist; a pair of guide means; means nonreleasably securing said guide means to the torso embracing portion of the harness means at each side thereof near its waist portion; other guide means nonreleasably secured to the harness means at the rear thereof, near the center; a pair of tension lines, one for each of said arm fastening elements, each connected at one end to its arm fastening element and slidably and nondisengageably trained through that one of said pair of guide means located at the adjacent side of the harness means and through said other guide means; and a terminal element at the rear of the harness means with which the other end of each of said tension lines is connected and which is adapted to be connected with a part that has motion relative to the seat, in a direction to effect tensioning of the lines, upon ejection of an occupant wearing the harness means to thereby draw the forearms of the occupant toward said first named guide means.

11. In a protective device for moving the limbs of an occupant of an ejectable aircraft carried escape device to predetermined positions in which they are favorably disposed for ejection: a harness adapted to be worn by an occupant of an ejectable escape device, and having a torso embracing portion parts of which are located at the rear and at the sides of the wearer; a plurality of limb embracing elements, one securable to each of an occupant's limbs to be positioned; first guide means nonreleasably secured to the harness at each side of its torso embracing portion and so located that when limb embracing elements are adjacent to the guide means at their respective sides, the occupant's limbs to be positioned will be favorably disposed for ejection; other guide means nonreleasably secured to the harness at the rear thereof, near its center; a terminal element connectable with a part carried by an aircraft and which has motion relative to the escape device upon ejection; and line means connecting said terminal element with each of said limb embracing elements and nondisengageably trained through said other guide means, said line means comprising a separate line connected with each limb embracing element and nondisengageably trained through said first guide means at its respective side of the harness, so that upon ejection the movement of the terminal element effects tensioning of the line means by which the limb embracing elements are drawn toward the first guide means at their respective sides of the harness, to thereby bring the occupant into a position favorable for ejection escape.

References Cited in the file of this patent

UNITED STATES PATENTS

| | | |
|---|---|---|
| 2,836,382 | Martin | May 27, 1958 |
| 2,940,701 | Beem et al. | June 14, 1960 |
| 2,944,774 | Martin | July 12, 1960 |

FOREIGN PATENTS

| | | |
|---|---|---|
| 1,165,819 | France | June 9, 1958 |